Sept. 18, 1934.      F. GRAY      1,974,067
ELECTROOPTICAL SYSTEM
Filed Aug. 12, 1931
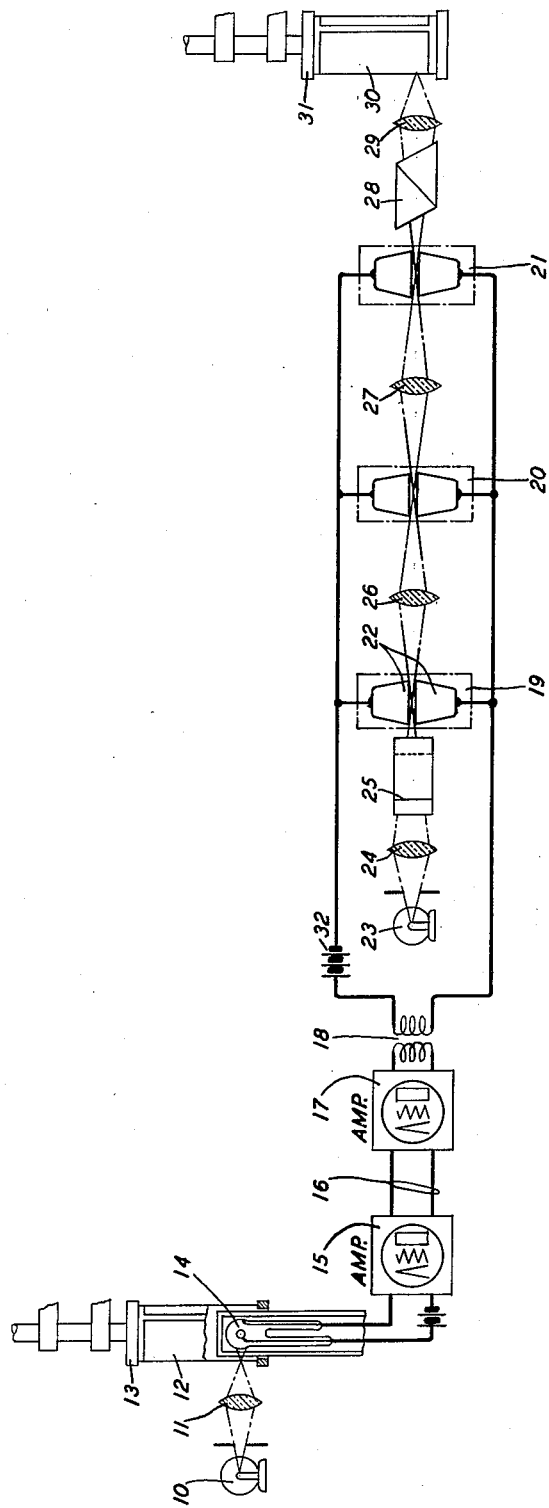
INVENTOR
*F. GRAY*
BY
*O. A. Sprague.*
ATTORNEY Patented Sept. 18, 1934

1,974,067

UNITED STATES PATENT OFFICE 1,974,067

ELECTROOPTICAL SYSTEM

Frank Gray, New York, N. Y., assignor to Bell Telephone Laboratories, Incorporated, New York, N. Y., a corporation of New York Application August 12, 1931, Serial No. 556,490

8 Claims. (Cl. 88—61)

This invention relates to optical and electro-optical systems and particularly to means for and methods of controlling the intensity of a light beam for producing images electro-optically.

An object of the invention is to increase the efficiency of light valves.

Another object of the invention is to increase the operating efficiency of an electro-optical light controlling system employing apparatus of the type in which a beam of polarized light is passed through a medium which becomes doubly refracting under the influence of an electric field.

Systems have been devised heretofore in which two crossed light polarizing devices, or Nicol prisms, and a device known as a Kerr cell, positioned intermediate the prisms, are employed to control the intensity of a beam of light in accordance with the electromotive force impressed upon the electrodes of the Kerr cell. In order that the electrostatic field between the plate electrodes may produce a sufficient effect upon the light beam, it has been found necessary to design the cell so that the separation between the plate electrodes is a small fraction of the length of the path traversed by the light beam between the plates. This narrow crevice between the electrodes seriously limits the amount of light that can be transmitted through it from a given light source and thus limits its usefulness as, for example, in the production of television images.

In accordance with the present invention, a light transmission system is provided with apparatus for efficiently controlling a characteristic of a light beam. The characteristic of the light beam is preferably controlled by acting upon it in stages and, prior to each stage, conditioning the light beam for permitting more effective action during each stage.

In accordance with a specific embodiment of the invention herein shown and described for the purpose of illustration, a plurality of Kerr cells are located in the path of a beam of light at different positions, respectively, along the line of propagation, and intermediate crossed light polarizing devices. It was pointed out above that when using a single cell, the ratio of the plate separation to the length of the light path between the plates should be made small. When using a plurality of cells, it is similarly necessary to make the ratio of the plate separation to the length of the light path between each pair of plates, multiplied by the number of cells, small. In this latter case, it is apparent that the distance between the plates of each cell may be somewhat increased and the length of the light path therethrough somewhat decreased, as compared with the dimensions of the single cell, without changing this ratio. Lenses are employed for focusing the light beam reaching each cell approximately at a point equidistant from the ends of both plates where the light beam enters and leaves the cell, respectively. By increasing the distance between the plates or decreasing the length of the plates as measured along the light path, or both, the angular light aperture between each pair of plates is increased and an increased amount of light can be transmitted through the cell. The cells are all connected in parallel to a source of electromotive force of varying amplitude and the amount of light transmitted through the system, or the light intensity reaching an area of given size will vary in accordance with the variations of the electromotive force of this source. A source of image current which varies in amplitude in accordance with the tone values of successively scanned elemental areas of a field of view may be connected to the Kerr cells to control the intensity of a beam of light from a fixed source for controlling the production of an image of the field of view.

The drawing to which reference will now be made is a schematic showing of a picture transmission system embodying the invention.

Light from the lamp 10 is focused by means of a lens 11 upon the negative picture film 12 mounted upon the drum 13. This drum is caused to rotate and at the same time move in an axial direction so that the elemental areas of the picture are illuminated in succession along a helical path. Light received from the successively illuminated elemental areas of the picture reaches the photo-electric cell 14 to cause the photoelectric current in the circuit of the photoelectric cell 14 to vary in accordance with the tone values of the successively scanned elemental areas of the picture. This current is amplified by the vacuum tube amplifier 15, and transmitted over the line 16 or other suitable transmission channel which connects the transmitting and receiving stations.

At the receiving station the received image current is amplified by the vacuum tube amplifier 17, the output of which is connected to the primary winding of the transformer 18. The secondary winding of this transformer is connected to a light controlling apparatus which will now be described. There are provided three Kerr cells 19, 20 and 21, each comprising a pair of plates or electrodes 22 having opposed, plane, parallel surfaces immersed in a suitable fluid such as nitrobenzol which has the property of doubly refracting light when subjected to the action of an electric field. The cells may be so positioned that the opposed surfaces lie in two parallel planes, although in certain cases a different arrangement may be preferred. The Kerr cells are connected in parallel directly to the energizing circuit consisting of secondary winding of the transformer 18 and a biasing battery 32 and are thus simultaneously energized by a unidirectional electromotive force which varies in accordance with the tone values of the successively scanned elemental areas of the picture or object, an image of which is to be produced. Instead of employing the transformer 18 and the biasing battery 32, the Kerr cells may be connected directly in the anode circuit of the last stage of the vacuum tube amplifier 17. If desired, the image current may be used to modulate a high frequency carrier wave either at the transmitting or the receiving station and this modulated wave impressed upon the Kerr cells through a transformer.

When a single Kerr cell is employed for controlling a light beam, the separation between the opposed surfaces of the electrodes must be only a small fraction, one-twentieth for example, of the length of the path traversed by the light beam between the surfaces, in order that the electrostatic field between the plates may produce a sufficient action upon the light beam. A device having such a relatively long narrow light aperture is capable of transmitting only a relatively small amount of light and is therefore not suitable for use in a system in which a light controlling element capable of transmitting a large amount of light is required.

In order to provide a Kerr cell light controlling arrangement capable of transmitting a large amount of light, it has been found advantageous to employ two or more separated Kerr cells for acting upon a light beam at different positions along the line of propagation and lenses for directing the light upon the cells in a convergent beam or pencil. In such an arrangement the distance between the plates of each cell may be increased and/or the length of the light path between the plates somewhat decreased with respect to the dimensions which it is preferable or necessary to employ when using a single cell without changing the ratio of the plate separation to the total length of the light path between plates, that is, the length of the light path between the plates of one cell multiplied by the number of cells employed.

Referring again to the drawing, light from a bright spot of the light source 23 is brought to a focus by means of the lens 24 preferably at a point midway between the opposed surfaces of the electrodes 22 and equidistant from the ends of these electrodes where the light beam enters and leaves the cell. The light beam is polarized before entering the cell 19 by means of the Nicol prism 25. The lens 26 similarly focuses the light beam transmitted through the Kerr cell 19 at a point between the opposed surfaces of the electrodes of the Kerr cell 20 and the light beam transmitted through the Kerr cell 20 is similarly focused upon the Kerr cell 21 by the lens 27. The light beam passing through the Kerr cell 21 is transmitted through the analyzing Nicol prism and directed by the lens 29 upon a small spot on the light sensitive picture surface 30. The picture receiving surface 30 is mounted upon the drum 31 which is similar to the drum 13 at the transmitting station and is moved in synchronism therewith, any suitable speed control or synchronizing arrangement being employed.

The Nicol prisms 25 and 28 are arranged in a well known manner so that their principal sections are at right angles to each other and, when there is no voltage impressed on the Kerr cells 19, 20 and 21, so that none of the light polarized by the prism 25 is transmitted through the prism 28 to the picture receiving surface. When an electromotive force is applied to the electrodes of the Kerr cells, more or less light is transmitted through the analyzing prism 28 to the picture receiving surface, depending upon the magnitude of the applied electromotive force. The action on the light beam produced by the three Kerr cells 19, 20 and 21, is the same as that which would be produced by a single Kerr cell having electrodes three times the length of the electrodes employed in one of the cells 19, 20 and 21 measured along the path of the light beam in passing through the cell and having the same electrode separation. By employing a plurality of cells having relatively short electrodes in the direction of the light path, or electrodes which are relatively widely spaced, the light aperture of each cell is made relatively large so that a relatively large amount of light can be transmitted to a spot on the image receiving surface.

It is to be understood that the invention is not limited to the simple type of image producing system which is described and shown schematically in the drawing merely for the purpose of illustration. It is within the scope of the invention to employ, instead of a light source, a source of energy having a frequency range which extends above or below the visible spectrum, and the appended claims should be interpreted with this in mind. The invention, moreover, is not limited to a picture transmission system, but may be employed in other systems, as for example, television or sound recording systems. While various uses may be found for this invention, it appears to be especially useful in electro-optical systems, such as television systems, for example, in which it is desirable to produce a light beam, the intensity of which may be varied over a wide range of values. It is apparent that in such a system, it may be desirable to employ an electrically operated light controlling apparatus not only capable of transmitting a large amount of light, but also capable of varying the amount of light transmitted in accordance with the variations of a source of television image current having frequency components extending over a wide range. The Kerr cell arrangement disclosed is suitable for such use.

It is also within the scope of the invention to employ improved types of Kerr cells as, for example, Kerr cells of the type disclosed in Patent 1,788,470 granted to H. Nyquist, January 13, 1931. Since the type of light valve there disclosed employs two pairs of electrodes, it would obviously be necessary, when employing a plurality of such cells in the light controlling arrangement disclosed in this application, to connect the corresponding pairs of electrodes in parallel and to energize the different pairs of electrodes in a manner such as disclosed in the Nyquist patent.

What is claimed is:

1. The method of signaling which comprises producing a light beam, similarly modulating said light beam under control of electric signaling energy simultaneously in a plurality of stages so as to obtain an increased modulating effect, each stage being such as to produce only a relatively small modulating effect, and directing the beam prior to each stage for causing more effective modulation in said stages.

2. The method of modulating a light beam which comprises similarly modulating the light beam under control of electric signaling energy simultaneously in a plurality of stages so as to obtain an additive modulating effect, and conditioning the beam prior to each stage for increasing the amount of light which is acted upon during each stage.

3. In combination, a plurality of Kerr cells, means for directing a beam of light through one of said cells, and optical means for acting upon the emergent beam to direct it in a convergent beam to another of said Kerr cells.

4. In combination, a plurality of Kerr cells each having a pair of plates with opposed plane surfaces, a source of light, means for focusing a beam of light from said source at a position between the plates of one of said Kerr cells, and means for focusing the emergent beam at a position between the plates of another of said Kerr cells.

5. In combination, means for producing a beam of light, more than two light valves located at different positions respectively along the line of propagation of said light beam for controlling a characteristic thereof, and a plurality of optical devices, one for each of said light valves, each for effectively directing the beam upon its associated light valve.

6. The method of increasing the amount of light which may be effectively modulated by the action of a birefringent substance acted upon by an electrostatic field or fields set up between electrodes immersed in a birefringent substance under control of an electromotive force which varies between fixed limits, which comprises setting up a plurality of similar electrostatic fields between spaced sets of electrodes under control of the electromotive force for simultaneously acting upon a light beam at different positions, respectively, along the line of propagation, dimensioning and spacing the electrodes to give each set a relatively large light aperture such that the fields set up by one set of electrodes alone under the influence of said electromotive force is insufficient to effectively modulate the light beam but the plurality of fields acting simultaneously on the light beam being sufficient to effectively modulate the light beam, and focusing the light beam between the electrodes of each set.

7. Apparatus for effectively modulating a large amount of light by the action of a birefringent substance influenced electrostatically, which comprises a plurality of spaced sets of electrodes immersed in the birefringent substance for simultaneously acting upon the light beam at different positions, respectively, along the line of propagation, each set having a relatively large light aperture such that the field set up by one set of electrodes alone under the influence of an electromotive force which varies between fixed limits is insufficient to effectively modulate the light beam, means for simultaneously setting up similar fields between said sets of electrodes, respectively, under control of the source of varying electromotive force, and means for focusing the light beam between the electrodes of each set.

8. Electro-optical light controlling means comprising means for producing a beam of plane polarized light, a plurality of pairs of electrodes having opposed surfaces lying substantially in two parallel planes, a birefringent substance between said pairs of electrodes, means for focusing the light beam between one pair of electrodes, means for focusing the emergent beam between another pair of electrodes, a source of voltage which varies between fixed limits connected to said pairs of electrodes for simultaneously setting up similar fields between said pairs of electrodes respectively, and analyzing means for transmitting light in accordance with the action of said fields upon said birefringent substance, each of said pairs of electrodes having a relatively large light aperture such that the action of the field set up between one pair of electrodes alone is insufficient to effectively control the light beam but the action of the fields set up by the plurality of pairs of electrodes being sufficient to effectively control the light beam.

FRANK GRAY.